United States Patent
Dides

(10) Patent No.: US 10,397,194 B2
(45) Date of Patent: Aug. 27, 2019

(54) DYNAMIC TRANSMISSION OF ENCRYPTED DATA

(71) Applicant: eBay Inc., San Jose, CA (US)

(72) Inventor: Emil Dides, Coppell, TX (US)

(73) Assignee: eBay Inc., San Jose, CA (US)

( * ) Notice: Subject to any disclaimer, the term of this patent is extended or adjusted under 35 U.S.C. 154(b) by 279 days.

(21) Appl. No.: 15/208,435

(22) Filed: Jul. 12, 2016

(65) Prior Publication Data
US 2018/0019975 A1    Jan. 18, 2018

(51) Int. Cl.
*H04L 29/06* (2006.01)
*H04W 12/08* (2009.01)
*H04W 4/02* (2018.01)
*H04W 4/80* (2018.01)

(52) U.S. Cl.
CPC ........ *H04L 63/0428* (2013.01); *H04L 63/107* (2013.01); *H04W 4/023* (2013.01); *H04W 4/80* (2018.02); *H04W 12/08* (2013.01)

(58) Field of Classification Search
CPC ....... H04W 4/80; H04W 88/04; H04W 76/10; H04W 4/025
See application file for complete search history.

(56) References Cited

U.S. PATENT DOCUMENTS

| | | | |
|---|---|---|---|
| 2007/0038743 A1* | 2/2007 | Hellhake et al. ....... | G06F 15/17 709/224 |
| 2013/0217332 A1* | 8/2013 | Altman ................. | H04H 60/90 455/41.2 |
| 2013/0322436 A1* | 12/2013 | Wijnands et al. ...... | H04L 12/28 370/389 |
| 2014/0196025 A1* | 7/2014 | Corinella ................. | G06F 8/61 717/178 |
| 2015/0269638 A1* | 9/2015 | Chatterton ......... | G06Q 30/0281 705/5 |
| 2017/0359314 A1* | 12/2017 | Mathias et al. ......... | H04L 29/06 |

* cited by examiner

*Primary Examiner* — Christopher C Harris
(74) *Attorney, Agent, or Firm* — Schwegman Lundberg & Woessner, P.A.

(57) ABSTRACT

Embodiments of the present disclosure may be used to securely transmit data between multiple computing devices. Among other things, this can greatly extend the range of data transmissions in comparison to fixed-position wireless beacons and access points.

20 Claims, 5 Drawing Sheets

DYNAMIC TRANSMISSION OF ENCRYPTED DATA

TECHNICAL FIELD

Embodiments of the present disclosure relate generally to data transmission and, more particularly, but not by way of limitation, to transmitting encrypted data to multiple devices.

BACKGROUND

The popularity of smartphones, tablets, and other mobile computing devices continues to grow. Along with this popularity is an increasing focus on the ability of such devices to interconnect and communicate with each other. However, conventional systems for distributing data often rely on a limited number of fixed wireless access points. Moreover, many conventional systems have a limited range over which they can transmit data. Embodiments of the present disclosure address these and other issues.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Embodiments of the present disclosure may be used to securely transmit data between multiple computing devices. Among other things, this can greatly extend the range of data transmissions in comparison to fixed-position wireless beacons and access points.

Figure 1:
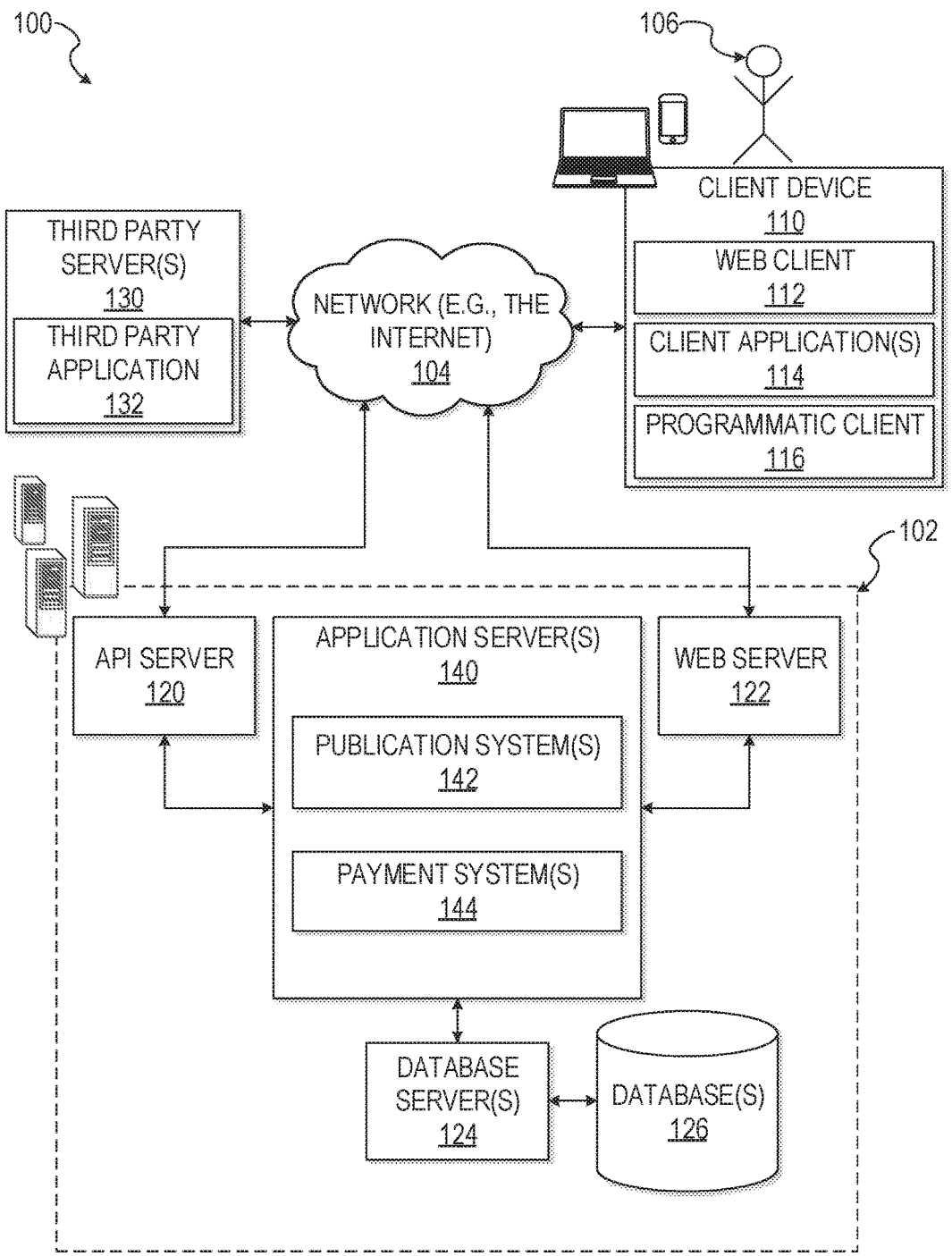
FIG. 1 is a block diagram of an exemplary networked system, according to various embodiments.

With reference to FIG. 1, an exemplary embodiment of a high-level client-server-based network architecture 100 is shown. A networked system 102, in the example forms of a network-based marketplace or payment system, provides server-side functionality via a network 104 (e.g., the Internet or wide area network (WAN)) to one or more client devices 110. FIG. 1 illustrates, for example, a web client 112 (e.g., a browser, such as the Internet Explorer® browser developed by Microsoft® Corporation of Redmond, Wash. State), an application 114, and a programmatic client 116 executing on client device 110.

The client device 110 may comprise, but are not limited to, various types of mobile devices, such as portable digital assistants (PDAs), smart phones, tablets, ultra books, multi-processor systems, microprocessor-based or programmable consumer electronics, or any other communication device that a user may utilize to access the networked system 102. In some embodiments, the client device 110 may comprise a display module (not shown) to display information (e.g., in the form of user interfaces). In further embodiments, the client device 110 may comprise one or more of a touch screens, accelerometers, gyroscopes, cameras, microphones, global positioning system (GPS) devices, and so forth. The client device 110 may be a device of a user that is used to perform a transaction involving digital items within the networked system 102. In one embodiment, the networked system 102 is a network-based marketplace that responds to requests for product listings, publishes publications comprising item listings of products available on the network-based marketplace, and manages payments for these marketplace transactions. One or more users 106 may be a person, a machine, or other entity for interacting with client device 110. In embodiments, the user 106 is not part of the network architecture 100, but may interact with the network architecture 100 via client device 110 or another systems and devices. For example, one or more portions of network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

In some exemplary embodiments (as described in more detail below), the client device 110 and target devices 330-342 may include a communication interface that allows the device to communicate directly with one or more other devices. Using the communication interface, a device can transmit encrypted data packets using near-field communications (NEC) protocol and/or another wireless communication protocol. A more detailed description of an exemplary communication interface is described with reference to communication interface 464 shown for the device 400 in FIG. 4.

Referring again to FIG. 1, each client device 110 may include one or more applications (also referred to as "apps") such as, but not limited to, a web browser, messaging application, electronic mail (email) application, an e-commerce site application (also referred to as a marketplace application), and the like. In some embodiments, if the e-commerce site application is included in a given one of the client device 110, then this application is configured to locally provide the user interface and at least some of the functionalities with the application configured to communicate with the networked system 102, on an as needed basis, for data and/or processing capabilities not locally available (e.g., access to a database of items available for sale, to authenticate a user, to verify a method of payment). Conversely if the e-commerce site application is not included, in the client device 110, the client device 110 may use its web browser to access the e-commerce site (or a variant thereof) hosted on the networked system 102.

One or more users 106 may be a person, a machine, or other entity for interacting with the client device 110. In some exemplary embodiments, the user 106 is not part of the network architecture 100, but may interact with the network architecture 100 via the client device 110. For instance, the user 106 provides input (e.g., touch screen input or alphanumeric input) to the client device 110 and the input is communicated to the networked system 102 via the network 104. In this instance, the networked system 102, in response to receiving the input from the user, communicates information to the client device 110 via the network 104 to be presented to the user 106. In this way, the user 106 can interact with the networked system 102 using the client device 110. In some exemplary embodiments, as discussed in more detail below with reference to FIG. 3, for example, the networked system 102 may be (or include) a source computing device that generates data packets for distribution among one or more client devices 110 or other target devices.

An application program interface (API) server 120 and a web server 122 are coupled to, and provide programmatic and web interfaces respectively to, one or more application servers 140. The application servers 140 may host one or more publication systems 142 and payment systems 144, each of which may comprise one or more modules or applications and each of which may be embodied as hardware, software, firmware, or any combination thereof. The application servers 140 are, in turn, shown to be coupled to one or more database servers 124 that facilitate access to one or more information storage repositories or database(s) 126. In an exemplary embodiment, the databases 126 are storage devices that store information to be posted (e.g., publications or listings) to the publication system 120. The databases 126 may also store digital item information in accordance with exemplary embodiments.

Additionally, a third party application 132, executing on third party server(s) 130, is shown as having programmatic access to the networked system 102 via the programmatic interface provided by the API server 120. For example, the third party application 132, utilizing information retrieved from the networked system 102, supports one or more features or functions on a website hosted by the third party. The third party website, for example, provides one or more promotional, marketplace, or payment functions that are supported by the relevant applications of the networked system 102.

The publication system 142 provides a number of publication functions and services to users 106 that access the networked system 102. The payment system 144 likewise provides a number of functions to perform or facilitate payments and transactions. While the publication system 142 and payment system 144 are shown in FIG. 1 to both form part of the networked system 102, it will be appreciated that, in alternative embodiments, each system 142 and 144 may form part of a payment service that is separate and distinct from the networked system 102. In some embodiments, the payment systems 144 may form part of the publication system 142.

Further, while the client-server-based network architecture 100 shown in FIG. 1 employs a client-server architecture, the present inventive subject matter is of course not limited to such an architecture, and could equally well find application in a distributed, or peer-to-peer, architecture system, for example. The various publication system 142 and payment system 144 could also be implemented as standalone software programs, which do not necessarily have networking capabilities.

The web client 112 may access the various publication and payment systems 142 and 144 via the web interface supported by the web server 122. Similarly, the programmatic client 116 accesses the various services and functions provided by the publication and payment systems 142 and 144 via the programmatic interface provided by the API server 120. The programmatic client 116 may, for example, be a seller application (e.g., the Turbo Lister application developed by eBay® Inc., of San Jose, Calif.) to enable sellers to author and manage listings on the networked system 102 in an off-line manner, and to perform batch-mode communications between the programmatic client 116 and the networked system 102.

Figure 2:
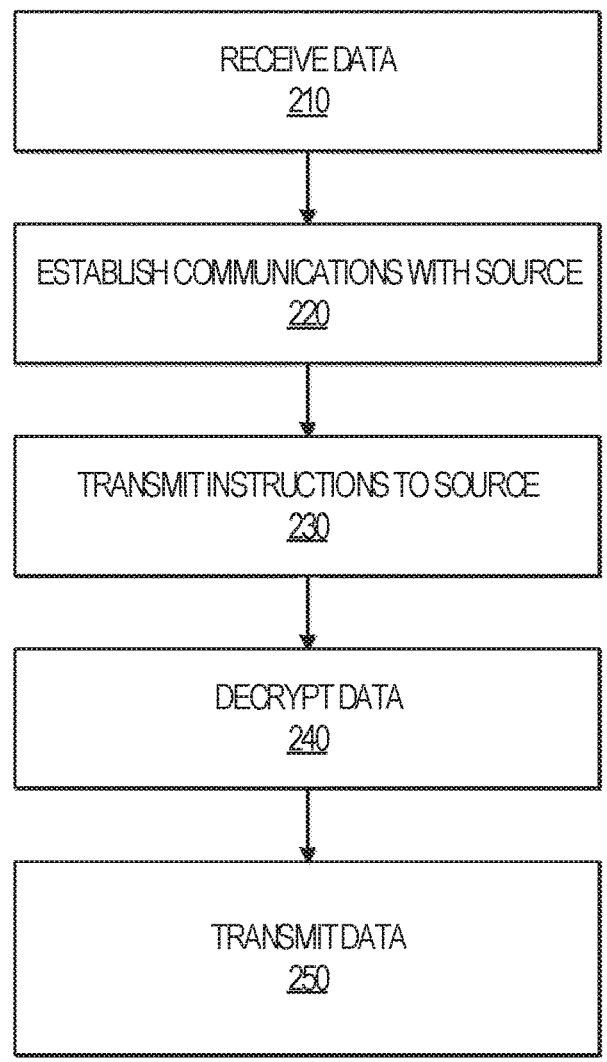
FIG. 2 is a flow diagram of an exemplary process according to various embodiments.

FIG. 2 depicts an exemplary method 200 according to various aspects of the present disclosure. Embodiments of the present disclosure may practice the steps of method 200 in whole or in part, and in conjunction with any other desired systems and methods. The functionality of method 200 may be performed, for example using any combination of the systems depicted in FIGS. 1 and/or 4.

In the example depicted in FIG. 2, method 200 includes a target device receiving data transmitted from a client device and originating from a source device (210), establishing communications with the source device (220), transmitting instructions from the target device to the source device to control the source computing device and cause it to transmit decryption information to the target device (230), decrypting the data based on the decryption information (240), and retransmitting the data to a second target device by the target device (250).

Figure 3A:
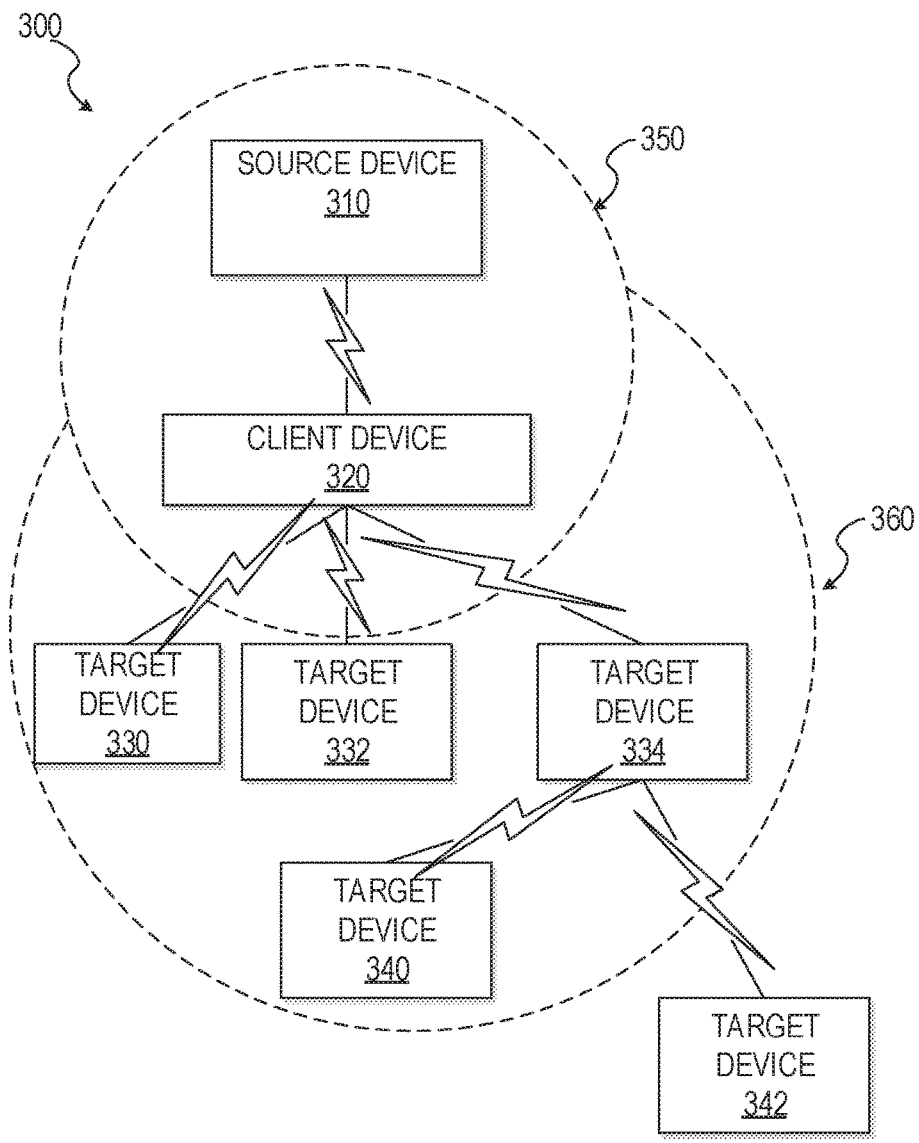
FIGS. 3A and 3B illustrate communication between multiple devices according to various embodiments.

FIG. 3A illustrates an example where a client device 320 is in communication with a source device 310 and three target devices 330, 332, 334. Additionally, target device 334 is in communication with target devices 340 and 342. In this example, the client device 320 receives data from the source device, and retransmits the data to target devices 330, 332, and 334 as described below. Any of the devices in FIGS. 3A and 3B may be mobile computing devices. In some exemplary embodiments some of the devices (such as the source device 310) may be statically located. For example, the source device 310 may be a wireless beacon located in a business for broadcasting data (such as advertisements, coupons, sales alerts, etc.) to nearby devices.

Figure 3B:
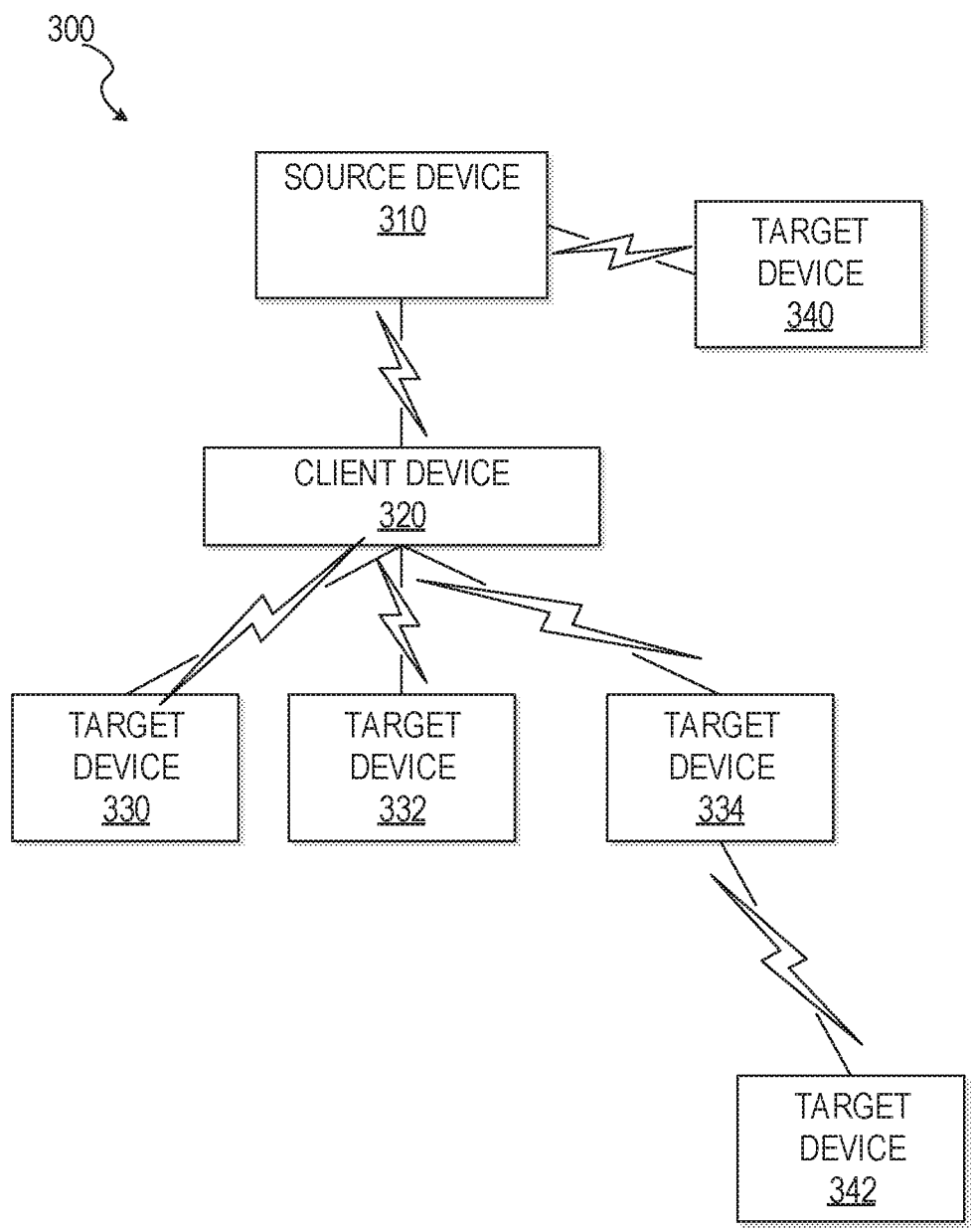

The various devices in FIGS. 3A and 3B may transmit, receive, and retransmit a data packet originating from the source device 310. For example, a device (such as target device 334 in FIG. 3) can receive data (210) from a client device (e.g., client device 320) that originates from a source device (e.g., source device 310). In the example shown in FIG. 3, the source device 310 generates an encrypted packet containing data which it transmits to one or more client devices 320 and/or target devices 330, 332, 334, 340 and/or 342. Any size and number of encrypted data packets may be generated, and such packets may include any desired data in any format, including files, portions of files, images, video, text, etc. The data may, for example, include alerts, advertisements, coupons, or other offers for users of the client device 320 and/or target devices 330, 332, 334, 340 and/or 342. The data packet may be encrypted in any desired manner, including using an asymmetric encryption algorithm and/or symmetric encryption algorithm. The packet can be transmitted using any desired communications protocol, including a near-field communication (NFC) protocol, a Low Energy Bluetooth (BLE) protocol, and the like.

In the example shown in FIG. 3A, the source device 310 uses a short-range transmission protocol (e.g., NEC, BLE, etc.) with a limited range 350, and only the client device 320 is currently in range. However, embodiments of the present disclosure can be used to overcome the conventional limitations of the source device's 310 transmission range to securely deliver data originating from the source device 310 to target devices not in direct communication with the source device 310.

For example, the client device 320 may receive an encrypted data packet from the source device 310, establish communication with target devices 330, 332, and 334, and retransmit the encrypted data packet to target devices 330, 332, and 334. In some embodiments, the client device 320 may receive decryption information from the source device 310 to decrypt the data in the packet. In other embodiments, the client device may not receive decryption information, and only relays the encrypted data packet to the target devices 330, 332, 334. The latter case may likewise be extended across any number of additional devices, thus allowing embodiments of the disclosure to securely deliver an encrypted data packet to a desired recipient.

Target devices receiving the encrypted data may also transmit (250) the data to other target devices. In the Example shown in FIG. 3A, target device 334 receives (210) the data from the client device 320, establishes communication with target devices 340 and 342, and transmits (250) the data to target devices 340 and 342.

Transmission of the data may be restricted based on a variety of criteria. In FIG. 3A, for example, the source device 310 may instruct the client device 320 and target devices 330-342 to determine geolocation information for any potential recipient device and only transmit the data to the recipient device if the device meets certain criteria. Such criteria may include, for example, that the recipient device is within a predetermined distance of the transmitting device and/or the source device 310, or that the recipient device is within a predetermined geographic area. In a specific example, target device 334 may receive, in addition to the encrypted data packet, an instruction originating from the source computing device 310 to determine geolocation information for potential recipients of the encrypted data packet (i.e., target devices 340 and 342 in the example shown in FIG. 3A). The instruction from the source computing device 310 may further limit retransmission of the data packet to devices within geographical area 360. In this case, target device 334 determines from the geolocation information for target device 340 and 342 that target device 340 is within the predetermined geographical boundary 360, and transmits the encrypted data packet to device 340 accordingly. Target device 342, on the other hand, is outside the predetermined geographical boundary 360, and therefore target device 334 abstains from transmitting the encrypted data packet to device 342.

In one example, data from the source device 310 is received by the client device 320 and transmitted via encrypted packet to all target devices within a predetermined distance of the source device 310, as determined using geolocation hardware on the client device 310 and/or target devices. In another example, data from the source device 310 is transmitted to a predetermined number of target devices by the client device 320. In this manner, data from a source device 310 that is a wireless beacon within a particular store may only be pertinent (as in the case of a coupon or other offer) to target devices near the store. Likewise, a merchant may wish to control the number of offers extended to various target devices. Embodiments of the present disclosure provide users with the control to address both cases.

Transmission of the data may additionally or alternatively be restricted based on specific identifiers associated with the potential recipient device. For example, the source device 310 may send a request to the client device 310, which is in turn relayed to and among the target devices 330-342 requesting device identification information for each respective device. The source device 310 may then generate the encrypted data packet and instruct devices retransmitting the data packet to only transmit the data packet to devices having one or more particular identifiers. For example, target device 334 may receive an identifier associated with target device 340 as a valid recipient of the encrypted data packet originating from the source device 310. Target device 334 may then establish communication with device 340 and transmit the encrypted data packet to device 334 accordingly. In contrast, target device 342 may not be identified as a valid recipient of the encrypted data packet, and therefore target device 334 abstains from transmitting the packet to device 342.

Transmission of the data may additionally or alternatively be based on temporal restrictions, where a device transmits the encrypted data packet to one or more additional devices within a predetermined time period, and abstains from transmitting the data packet otherwise. Such temporal restrictions may be determined by the source computing device 310 and relayed to devices retransmitting the data packet.

Transmission of the data may additionally or alternatively be based on authorization/acceptance of the data from the recipient device. For example, target device 334 may establish communications with target devices 340 and 342 and (assuming no other restrictions) confirm with each device whether device 334 is authorized to transmit the data packet to each device. If target device 340 refuses to grant authorization and target device 342 grants authorization, the target device transmits the encrypted data packet to device 342 and abstains from transmitting the data packet to device 340. In this manner, the users of potential recipient devices can set filters to selectively receive and reject data based on types of content, the origin (e.g. the source device 310) of such content, and other factors.

In some embodiments, the data from the source device 310 may be unencrypted, and retransmitted to any device within range of any other device. In the example shown in FIG. 3A, this would result in the client device 320 and all five target devices 330-342 receiving (and being able to read) the data from the source device 310.

In other embodiments, the data packet is encrypted and decryption information must be received from the source device 210 in order to decrypt the packet. In other cases, the data packet includes a mix of encrypted and unencrypted data. Referring again to FIG. 3A, consider a case where an encrypted data packet originating from source device 310 is: transmitted to client device 320; transmitted from client device 320 to target device 334; and transmitted from target device 334 to target device 340. As shown, target device 340 is not in communication with source device 310 when the encrypted data packet is received from target device 334. Referring now to FIG. 3B, subsequent to receiving the encrypted data packet, the target device 340 (e.g., a mobile computing device) moves into communications range of the source device 310 and establishes communication (220) with the source computing device 310.

In response to establishing communication with the source device 310, the target device 340 may receive decryption information (e.g., as part of a symmetric and/or asymmetric encryption algorithm) to decode the data in the packet. In some embodiments, the decryption information may be transmitted to the target device 340 automatically by the source device 310 upon establishing communication. In other embodiments, the target device 340 transmits instructions (230) to the source device 310 instructing the source device to transmit the decryption information to the target device 340, thereby allowing the target device 340 to decrypt the data packet (240). Transmittal of the instructions to the source device may be performed automatically by the target device, or may be initiated in response to input from a user of the target device.

In this manner, embodiments of the present disclosure can securely deliver encrypted data to devices well outside the normal transmission range of the source device originating the data. An identifier (e.g., in an unencrypted portion of the data packet) can alert the user of the target device receiving the data packet as to its nature to entice the user to physically move within range of the source device 310 to access the data. In an exemplary retail application, a source device comprising a fixed-position beacon within a retail store can broadcast data packets to devices within range of the beacon that are subsequently relayed to devices outside the transmission range of the beacon, but still within a predetermined geographical area (e.g., within the same shopping mall) of the store. Unencrypted data in the packet can provide the location of the store (e.g., via a map showing the location of the store relative to the user's present location) and an indicator of an advertisement, offer, coupon, or other content embedded in the encrypted data. Upon moving within range of the beacon, the target device receiving the data packet can unencrypt the data and utilize the data to conduct a transaction, such as a purchase within the store.

As introduced above, embodiments of the disclosure may identify a subset of the total number of target devices with which a source device is in indirect communication with to identify devices (e.g., by location and/or identifiers) to transmit the encrypted data to. Additionally, embodiments of the present disclosure may transmit the encrypted data packet to a larger set of devices than are provided decryption data. In this manner many devices may receive and retransmit the packet to help distribute the data, but only a set of "allowed" target devices are eligible to receive the decryption information necessary to decode the packet, while other "disallowed" devices will not receive the decryption information. Among other things, this allows embodiments of the disclosure to broadcast the packet widely from the source device, while helping to ensure that target devices intended to decrypt the packet can do so, but also ensuring that the packet will remain encrypted for target devices not intended to decode the packet.

Some embodiments may be described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various exemplary embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some exemplary embodiments, the processors or processor-implemented modules may be located in a single geographic location (e.g., within a home environment, an office environment, or a server farm). In other exemplary embodiments, the processors or processor-implemented modules may be distributed across a number of geographic locations.

Figure 4:
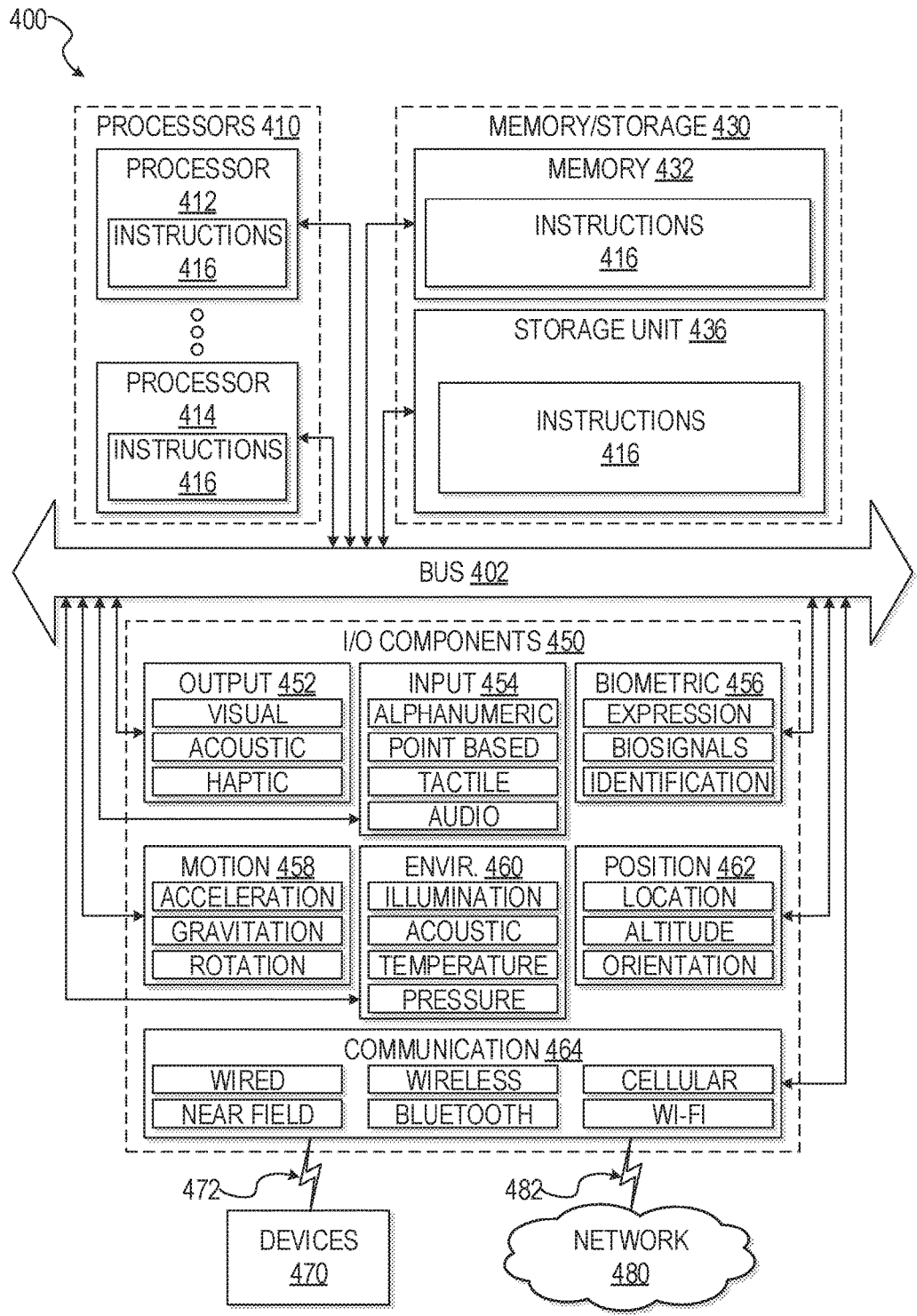
FIG. 4 is a block diagram of an exemplary machine in the form of a computer system within which a set of instructions may be executed for causing the machine to perform various functionality.

FIG. 4 is a block diagram illustrating components of a machine 400, according to some exemplary embodiments, able to read instructions from a machine-readable medium (e.g., a machine-readable storage medium) and perform any one or more of the methodologies discussed herein. Specifically, FIG. 4 shows a diagrammatic representation of the machine 400 in the example form of a computer system, within which instructions 416 (e.g., software, a program, an application, an applet, an app, or other executable code) for causing the machine 400 to perform any one or more of the methodologies discussed herein may be executed.

The computer system 400 may be a client computing device, such as client device 110 and/or client device 320 in FIGS. 1 and 3, and may store instructions in its memory 432 to cause the computer system 400 to execute the steps in method 200 shown in FIG. 2. The instructions transform the general, non-programmed machine into a particular machine programmed to carry out the described and illustrated functions in the manner described. The computer system 400 may operate as a standalone device or may be coupled (e.g., networked) to other systems and devices. In a networked deployment, the computer system 400 may operate in the capacity of a client machine in a server-client network environment or as a peer machine in a peer-to-peer (or distributed) network environment. The computer system 400 may comprise, but not be limited to, a personal computer (PC), a tablet computer, a laptop computer, a netbook, a personal digital assistant (PDA), a cellular telephone, a smart phone, a mobile device, a wearable device (e.g., a smart watch), a smart home device (e.g., a smart appliance), other smart devices, or any machine capable of executing the instructions 416, sequentially or otherwise, that specify actions to be taken by computer system 400. Further, while only a single computer system 400 is illustrated, the term "machine" or "computer system" shall also be taken to include a collection of machines/computer systems 400 that individually or jointly execute the instructions 416 to perform any one or more of the methodologies discussed herein.

The computer system 400 may include processors 410, memory 430, and I/O components 450, which may be configured to communicate with each other such as via a bus 402. In an exemplary embodiment, the processors 410 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (REIC), another processor, or any suitable combination thereof) may include, for example, processor 412 and processor 414 that may execute instructions 416. The term "processor" is intended to include multi-core processor that may comprise two or more independent processors (sometimes referred to as "cores") that may execute instructions contemporaneously. Although FIG. 4 shows multiple processors, the computer system 400 may include a single processor with a single core, a single processor with multiple cores (e.g., a multi-core process), multiple processors with a single core, multiple processors with multiples cores, or any combination thereof.

The memory/storage 430 may include a memory 432, such as a main memory, or other memory storage, and a storage unit 436, both accessible to the processors 410 such as via the bus 402. The storage unit 436 and memory 432 store the instructions 416 embodying any one or more of the methodologies or functions described herein. The instructions 416 may also reside, completely or partially, within the memory 432, within the storage unit 436, within at least one of the processors 410 (e.g., within the processor's cache memory), or any suitable combination thereof, during execution thereof by the computer system 400. Accordingly, the memory 432, the storage unit 436, and the memory of processors 410 are examples of machine-readable media.

As used herein, "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions 416. The term "machine-readable medium" shall also be taken to include any medium, or combination of multiple media, that is capable of storing instructions (e.g., instructions 416) for execution by a machine (e.g., computer system 400), such that the instructions, when executed by one or more processors of the computer system 400 (e.g., processors 410), cause the computer system 400 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 450 may include a wide variety of components to receive input, provide output, produce output, transmit information, exchange information, capture measurements, and so on. The specific I/O components 450 that are included in a particular machine will depend on the type of machine. For example, portable machines such as mobile phones will likely include a touch input device or other such input mechanisms, while a headless server machine will likely not include such a touch input device. It will be appreciated that the I/O components 450 may include many other components that are not shown in FIG. 4. The I/O components 450 are grouped according to functionality merely for simplifying the following discussion and the grouping is in no way limiting. In various exemplary embodiments, the I/O components 450 may include output components 452 and input components 454. The output components 452 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 454 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further exemplary embodiments, the I/O components 450 may include biometric components 456, motion components 458, environmental components 460, or position components 462 among a wide array of other components. For example, the biometric components 456 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 458 may include acceleration sensor components (e.g., accelerometer), gravitation sensor components, rotation sensor components (e.g., gyroscope), and so forth. The environmental components 460 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 462 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 450 may include communication interface 464 operable to couple the computer system 400 to a network 480 or devices 470 via coupling 482 and coupling 472 respectively. For example, the communication interface components 464 may include a network interface component or other suitable device to interface with the network 480. In further examples, communication interface 464 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 470 may be another machine or any of a wide variety of peripheral devices (e.g., a peripheral device coupled via a Universal Serial Bus (USB)).

Moreover, the communication interface components 464 may detect identifiers or include components operable to detect identifiers. For example, the communication components 464 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 464, such as, location via Internet Protocol (IP) geolocation, location via Wi-Fi® signal triangulation, location via detecting a NFC beacon signal that may indicate a particular location, and so forth.

In various exemplary embodiments, one or more portions of the network 480 may be an ad hoc network, an intranet, an extranet, a virtual private network (VPN), a local area network (LAN), a wireless LAN (WLAN), a wide area network (WAN), a wireless WAN (MAN), a metropolitan area network (MAN), the Internet, a portion of the Internet, a portion of the Public Switched. Telephone Network (PSTN), a plain old telephone service (POTS) network, a cellular telephone network, a wireless network, a Wi-Fi® network, another type of network, or a combination of two or more such networks. For example, the network 480 or a portion of the network 480 may include a wireless or cellular network and the coupling 482 may be a Code Division Multiple Access (CDMA) connection, a Global System for Mobile communications (GSM) connection, or other type of cellular or wireless coupling. In this example, the coupling 482 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 416 may be transmitted or received over the network 480 using a transmission medium via a network interface device (e.g., a network interface component included in the communication components 464) and utilizing any one of a number of well-known transfer protocols (e.g., hypertext transfer protocol (HTTP)). Similarly, the instructions 416 may be transmitted or received using a transmission medium via the coupling 472 (e.g., a peer-to-peer coupling) to devices 470. The term "transmission medium" shall be taken to include any intangible medium that is capable of storing, encoding, or carrying instructions 416 for execution by the computer system 400, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific exemplary embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

What is claimed is:

1. A system comprising:
   a processor;
   a communication interface coupled to the processor;
   memory coupled to the processor and storing instructions that, when executed by the processor, cause the system to perform operations comprising:
   receiving, via the communication interface, a data packet comprising encrypted data, the system not being located within a transmission range of a source computing device when the encrypted data packet is received by the system;
   establishing, subsequent to receiving the encrypted data packet and in response to the system moving within the transmission range of the source computing device, communication with the source computing device via the communication interface;
   in response to establishing communication with the source computing device, transmitting to the source computing device, via the communication interface, a request for decryption information for decrypting the encrypted data packet; and
   based on receiving the decryption information from the source computing device, decrypting the encrypted data packet based on the decryption information.

2. The system of claim 1, wherein the operations further comprise storing instructions for transmitting the encrypted data packet to a target computing device via the communication interface.

3. The system of claim 2, wherein transmitting the encrypted data packet to the target computing device includes:
   determining geolocation information of the target computing device; and
   transmitting the encrypted data packet to the target computing device in response to a determination, based on the geolocation information, that the target computing device is within a predetermined distance of one or more of the system and the source computing device.

4. The system of claim 2, wherein the data packet is transmitted to the system from a client computing device, and wherein transmitting the encrypted data packet to the target computing device includes:
   receiving, via the communication interface, an identifier associated with the target computing device from the client computing device;
   establishing communication with the target computing device based on the identifier; and
   transmitting the encrypted data packet to the target computing device in response to establishing communication with the target computing device.

5. The system of claim 2, wherein the operations further comprise storing instructions for transmitting the encrypted data packet to a plurality of target computing devices via the communication interface.

6. The system of claim 5, wherein transmitting the encrypted data packet to the plurality of target computing devices includes:
   transmitting the encrypted data packet to the plurality of target computing devices within a predetermined time period, and abstaining from transmitting the encrypted data packet otherwise.

7. The system of claim 6, wherein the data packet is transmitted to the system from a client computing device, and wherein an indicator of the predetermined time period originates from the source computing device and is transmitted to the system by the client computing device.

8. The system of claim 2, wherein transmitting the encrypted data packet to the target computing device includes:
   sending to the target computing device, using the communication interface, a request for an authorization to transmit the encrypted data packet to the target computing device; and
   based on receiving the authorization from the target computing device, transmitting the encrypted data packet to the target computing device in response to confirming authorization to transmit the encrypted data packet, and abstaining from transmitting the encrypted data packet to the target computing device otherwise.

9. The system of claim 2, wherein the data packet further comprises unencrypted data, the unencrypted data including location information for locating the transmission range of the source computing device.

10. A method comprising:
receiving, by a computer system via a communication interface, a data packet comprising encrypted data, the computer system is not located within a transmission range of a source computing device when the encrypted data packet is received by the computer system;
in response to the computer system moving within the transmission range of the source computing device, establishing, by the computer system and subsequent to receiving the encrypted data packet, communication with the source computing device via the communication interface;
in response to establishing communication with the source computing device, sending to the source computing device, via the communication interface, a request for decryption information for decrypting the encrypted data packet; and
based on receiving the decryption information from the source computing device, decrypting the encrypted data packet, by the computer system, based on the decryption information.

11. The method of claim 10, further comprising transmitting the encrypted data packet to a target computing device by the computer system via the communication interface.

12. The method of claim 11, wherein transmitting the encrypted data packet to the target computing device includes:
determining geolocation information of the target computing device; and
transmitting the encrypted data packet to the target computing device in response to a determination, based on the geolocation information, that the target computing device is within a predetermined distance of one or more of the computer system and the source computing device.

13. The method of claim 11, wherein the data packet is transmitted to the computer system from a client computing device, and wherein transmitting the encrypted data packet to the target computing device includes:
receiving, via the communication interface, an identifier associated with the target computing device from the client computing device;
establishing communication with the target computing device based on the identifier; and
transmitting the encrypted data packet to the target computing device in response to establishing communication with the target computing device.

14. The method of claim 11, further comprising transmitting the encrypted data packet to a plurality of target computing devices via the communication interface.

15. The method of claim 14, wherein transmitting the encrypted data packet to the plurality of target computing devices includes:
transmitting the encrypted data packet to the plurality of target computing devices within a predetermined time period, and abstaining from transmitting the encrypted data packet otherwise.

16. The method of claim 15, wherein the data packet is transmitted to the computer system from a client computing device, and wherein an indicator of the predetermined time period originates from the source computing device and is transmitted to the computer system by the client computing device.

17. The method of claim 11, wherein transmitting the encrypted data packet to the target computing device includes:
sending to the target computing device, using the communication interface, a request for an authorization to transmit the encrypted data packet to the target computing device; and
based on receiving the authorization from the target computing device, transmitting the encrypted data packet to the target computing device in response to confirming authorization to transmit the encrypted data packet, and abstaining from transmitting the encrypted data packet to the target computing device otherwise.

18. The method of claim 11, wherein the communication interface transmits the encrypted packet using a near field communications protocol.

19. A tangible, non-transitory computer-readable medium storing instructions that, when executed by a computer system, cause the computer system to perform operations comprising:
receiving, using a communication interface, a data packet comprising encrypted data, the computer system not being located within a transmission range of a source computing device when the encrypted data packet is received by the computer system;
establishing, subsequent to receiving the encrypted data packet, in response to the system moving within the transmission range of the source computing device, communication with the source computing device via the communication interface;
in response to establishing communication with the source computing device, sending to the source computing device, via the communication interface, a request for decryption information for decrypting the encrypted data packet; and
based on receiving the decryption information from the source computing device, decrypting the encrypted data packet based on the decryption information.

20. The computer-readable medium of claim 19, wherein the memory further stores instructions for transmitting the encrypted data packet to a target computing device by the computer system via the communication interface.

* * * * *